United States Patent
Nagayasu et al.

(10) Patent No.: US 10,751,833 B2
(45) Date of Patent: Aug. 25, 2020

(54) FIBER COUPLING DEVICE

(71) Applicant: Panasonic Intellectual Property Management Co., Ltd., Osaka (JP)

(72) Inventors: Doukei Nagayasu, Hyogo (JP); Hitoshi Nishimura, Osaka (JP); Makoto Ryudo, Hyogo (JP); Jingbo Wang, Hyogo (JP); Yoshiaki Takenaka, Osaka (JP); Kiyotaka Eizumi, Osaka (JP); Hideaki Yamaguchi, Osaka (JP); Ryo Ishikawa, Osaka (JP); Masatoshi Nishio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 164 days.

(21) Appl. No.: 16/072,232

(22) PCT Filed: Mar. 7, 2017

(86) PCT No.: PCT/JP2017/008883
§ 371 (c)(1),
(2) Date: Jul. 24, 2018

(87) PCT Pub. No.: WO2017/159439
PCT Pub. Date: Sep. 21, 2017

(65) Prior Publication Data
US 2019/0030641 A1 Jan. 31, 2019

(30) Foreign Application Priority Data
Mar. 17, 2016 (JP) .................................. 2016-053352

(51) Int. Cl.
B23K 26/035 (2014.01)
B23K 26/064 (2014.01)
(Continued)

(52) U.S. Cl.
CPC .......... B23K 26/035 (2015.10); B23K 26/064 (2015.10); G02B 6/2848 (2013.01);
(Continued)

(58) Field of Classification Search
CPC B23K 26/035; B23K 26/064; B23K 26/0643; G02B 6/2848; G02B 6/425;
(Continued)

(56) References Cited

U.S. PATENT DOCUMENTS

| 2004/0095572 A1 | 5/2004 | Iwa et al. |
| 2010/0260454 A1 | 10/2010 | Mills et al. |
| 2013/0051409 A1* | 2/2013 | Grapov ................ G02B 27/102 372/6 |

FOREIGN PATENT DOCUMENTS

| CN | 104977665 | 10/2015 |
| JP | 10-326931 | 12/1998 |

(Continued)

OTHER PUBLICATIONS

International Search Report of PCT application No. PCT/JP2017/008883 dated Apr. 11, 2017.

*Primary Examiner* — William R Alexander
*Assistant Examiner* — Ephrem Z Mebrahtu
(74) *Attorney, Agent, or Firm* — Wenderoth, Lind & Ponack, L.L.P.

(57) ABSTRACT

A fiber coupling device includes a housing and a window provided in the housing. The fiber coupling device is configured to collectively guide plural laser beams to at least a first fiber, the plurality of laser beams each being emitted from a corresponding one of plural external laser light sources and entering through a laser beam inlet. The housing is configured such that the laser beams enter the housing from the laser beam inlet. The window is provided inside the housing and faces the laser beam inlet. The fiber coupling
(Continued)

device is not required to detach when an optical axis is adjusted.

5 Claims, 4 Drawing Sheets

(51) Int. Cl.
*H01S 3/10* (2006.01)
*G02B 6/28* (2006.01)
*G02B 6/42* (2006.01)

(52) U.S. Cl.
CPC ........... *G02B 6/425* (2013.01); *G02B 6/4206* (2013.01); *H01S 3/10* (2013.01)

(58) Field of Classification Search
CPC .. G02B 6/0006; G02B 6/0068; G02B 6/0008; G02B 6/001; G02B 6/24; G02B 6/4296; H01S 3/067
See application file for complete search history.

(56) References Cited

FOREIGN PATENT DOCUMENTS

| | | |
|---|---|---|
| JP | 2003-211279 | 7/2003 |
| JP | 2004-130365 | 4/2004 |
| JP | 2004-138603 | 5/2004 |
| JP | 2007-065600 | 3/2007 |

\* cited by examiner

FIBER COUPLING DEVICE

This application is a U.S. national stage application of the PCT international application No.PCT/JP2017/008883 filed on Mar. 7, 2017, which claims the benefit of foreign priority of Japanese patent application No. 2016-053352 filed on Mar. 17, 2016, the contents all of which are incorporated herein by reference.

TECHNICAL FIELD

The present invention relates to a fiber coupling device used for a laser beam machine of a fiber transmission type.

BACKGROUND ART

In recent years, a high-power laser beam machine with a laser beam power exceeding several kilowatts has been widespread, and used in various production sites. Especially, a laser beam machine of a fiber transmission type has been widespread remarkably. A high-power laser beam is guided to a fiber and transmitted, and then used for processing.

To obtain a high-power laser beam, a laser oscillator has laser beams emitted from plural laser light sources spatially overlap one another to obtain a high-power laser beam, rather than a method of increasing power of a laser oscillator itself, serving as a light source for emitting a laser beam, i.e., increasing power of a single laser light source. A fiber coupling device allows the spatially overlapping laser beams are guided to a fiber and transmitted, and then used for processing (see, e.g., PTL 1).

A fiber coupling device that is used when a laser light source is changed or replaced is known (see, e.g., PTL 2).

Figure 4:
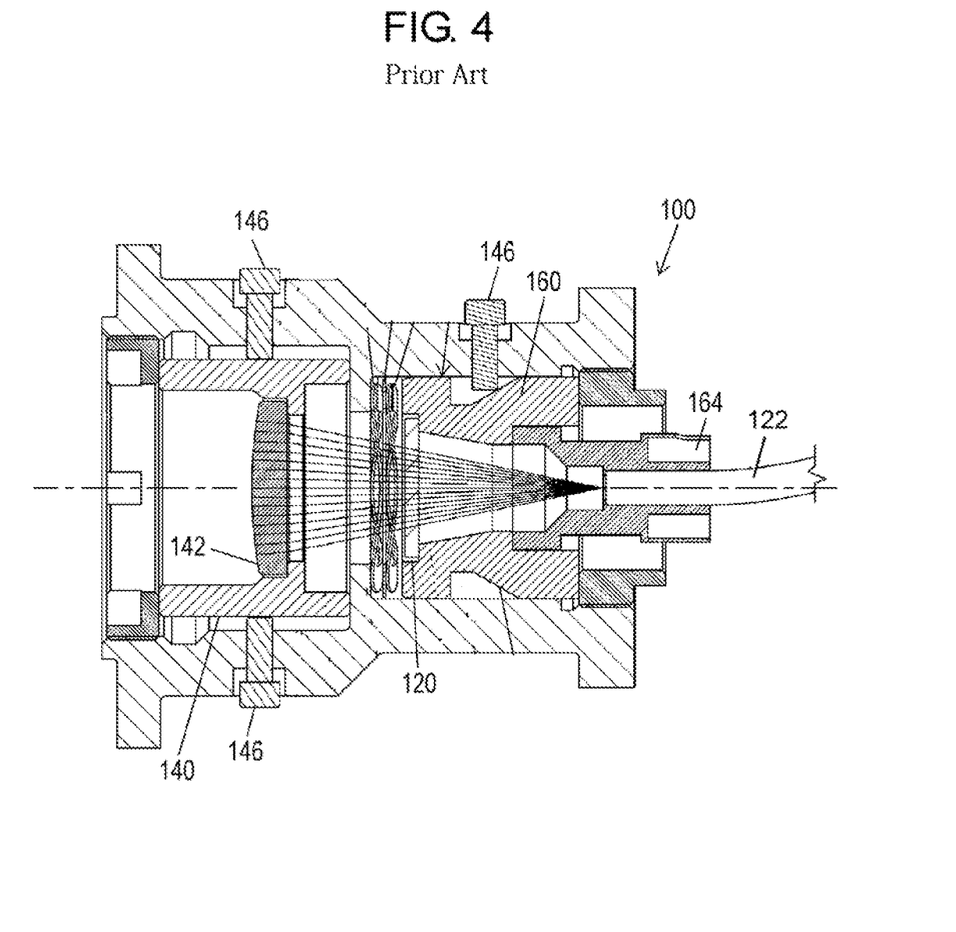
FIG. 4 is a cross-sectional view of a conventional fiber coupling device.

FIG. 4 is a cross-sectional view of conventional fiber coupling device 100. Fiber coupling device 100 is attached to a laser beam outlet of a laser oscillator constituted by plural laser light sources. Converging lens 142 included in fiber coupling device 100 is adjustably held via lens cylinder 140 with adjustment screw 146. Process fiber 122 is adjustably held via connector cylinder 160 and connector 164 with adjustment screw 146. Connector cylinder 160 includes cover glass 120 facing connector 164.

An operation of fiber coupling device 100 will be described below. Plural laser beams emitted from plural laser oscillators enter fiber coupling device 100. The laser beams are converged through converging lens 142 and guided to process fiber 122. At that moment, converging lens 142 is adjusted with adjustment screw 146, and process fiber 122 is adjusted with adjustment screw 146.

Only a specified laser light source among the plural laser light sources is replaced by the following method. After connector cylinder 160 is detached from fiber coupling device 100, fiber coupling device 100 is detached from plural laser oscillators, and then, lens cylinder 140 is detached. After that, the specified laser light source is replaced. Alternatively, after fiber coupling device 100 is detached from plural laser oscillators, lens cylinder 140 is detached. Then, the specified laser light source is replaced. Subsequently, connector cylinder 160 is attached to fiber coupling device 100 again, and then, fiber coupling device 100 is attached to the laser oscillators after lens cylinder 140 is returned back to fiber coupling device 100. Alternatively, fiber coupling device 100 is attached to the laser oscillators after lens cylinder 140 is returned back to fiber coupling device 100. After that, converging lens 142 or process fiber 122 is adjusted to operate.

CITATION LIST

Patent Literature

PTL 1: Japanese Patent Laid-Open Publication No. 2004-138603
PTL 2: U.S. Application Publication No. 2010/0260454

SUMMARY

A fiber coupling device includes a housing and a window provided in the housing. The fiber coupling device is configured to collectively guide plural laser beams to at least a first fiber, the plurality of laser beams each being emitted from a corresponding one of plural external laser light sources and entering through a laser beam inlet. The housing is configured such that the laser beams enter the housing from the laser beam inlet. The window is provided inside the housing and faces the laser beam inlet.

The fiber coupling device is not required to detach when an optical axis is adjusted.

DETAILED DESCRIPTION OF PREFERRED EMBODIMENTS

Exemplary Embodiment 1

Figure 1:
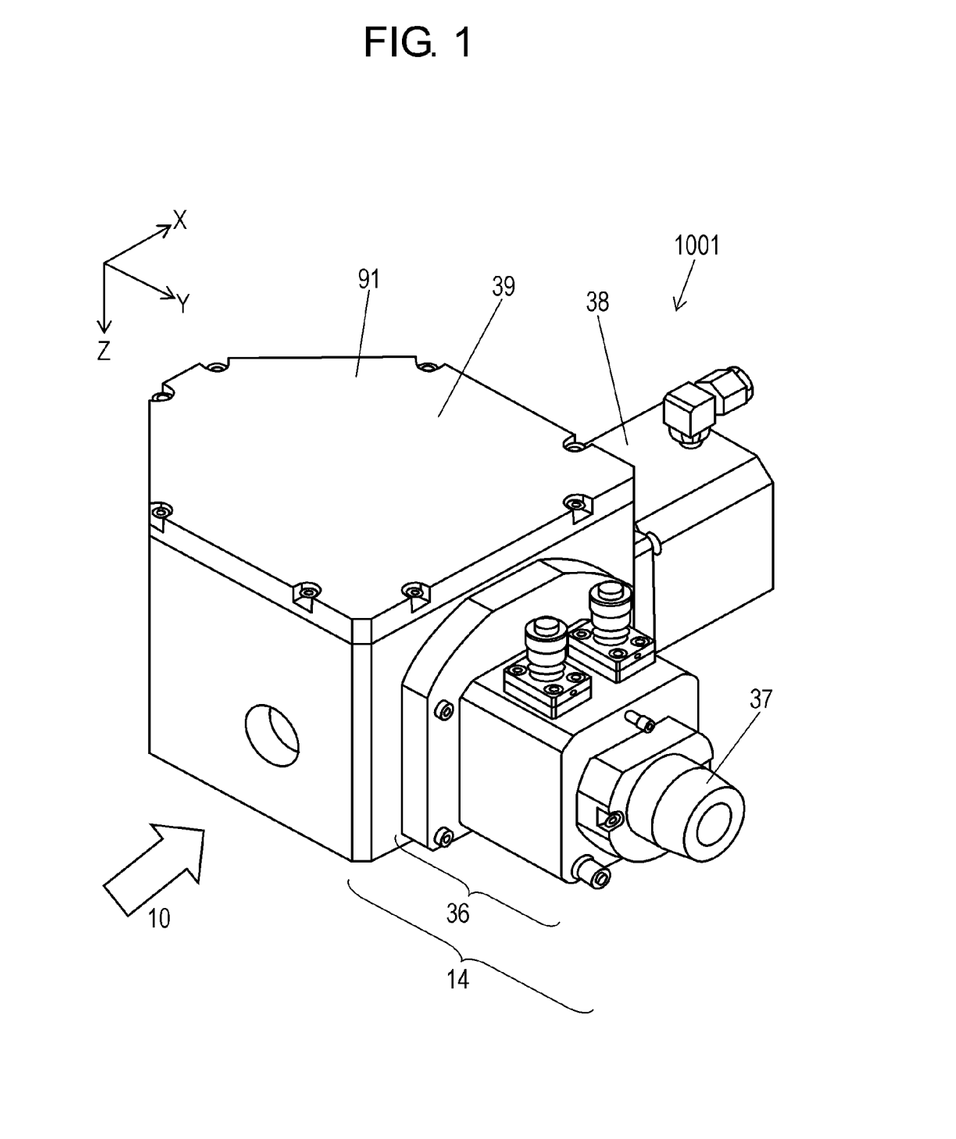
FIG. 1 is a perspective view of a fiber coupling device in accordance with Exemplary Embodiment 1.
Figure 2A:
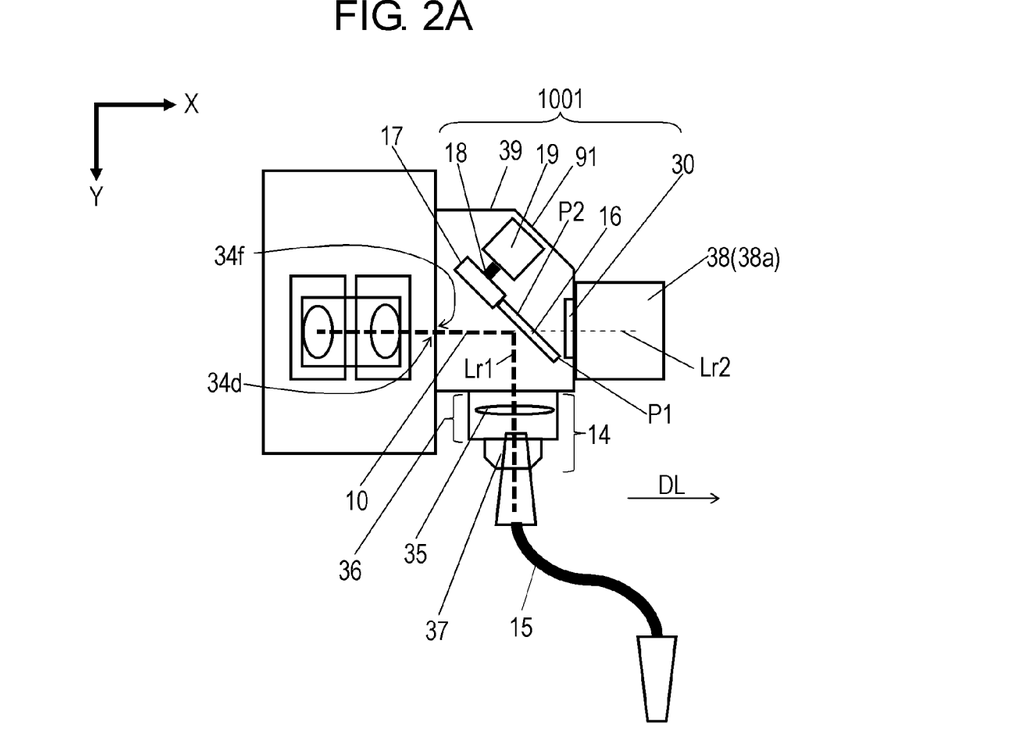
FIG. 2A is a schematic diagram of the fiber coupling device in accordance with Embodiment 1.
Figure 2B:
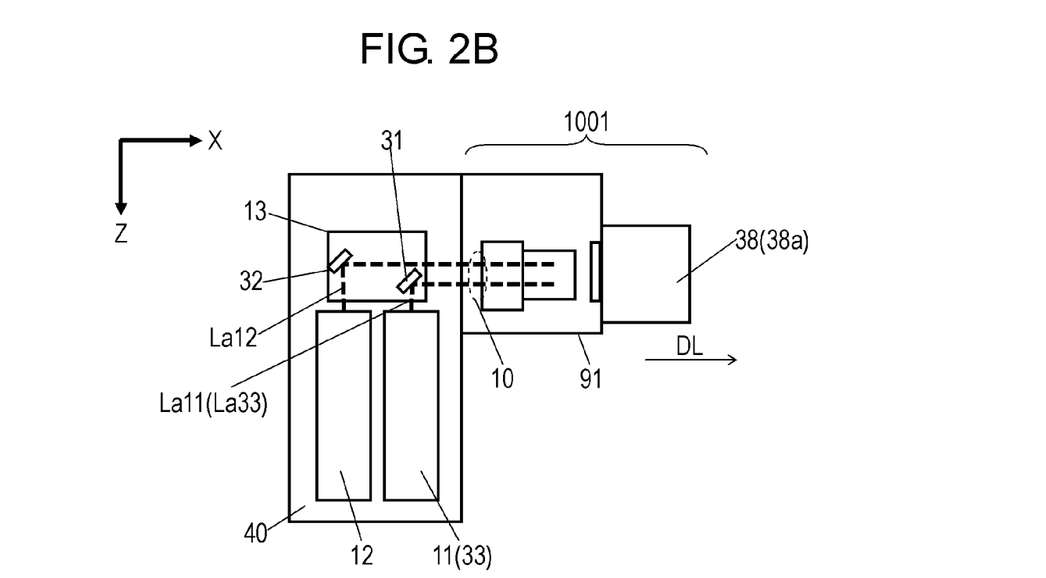
FIG. 2B is a schematic diagram of the fiber coupling device in accordance with Embodiment 1.

FIG. 1 is a perspective view of fiber coupling device 1001 in accordance with Exemplary Embodiment 1. FIGS. 2A and 2B are schematic diagrams of fiber coupling device 1001. In FIGS. 1, 2A, and 2B, an X-axis, a Y-axis, and a Z-axis crossing one another perpendicularly are defined. Along the X-axis, a positive direction of the X-axis, and a negative direction of the X-axis opposite to the positive direction of the X-axis are defined. Along the Y-axis, a positive direction of the Y-axis, and a negative direction of the Y-axis opposite to the positive direction of the Y-axis are defined. Along the Z-axis, a positive direction of the Z-axis, and a negative direction of the Z-axis opposite to the positive direction of the Z-axis are defined. FIG. 2A shows an arrangement of component members of fiber coupling device 1001 viewing in the positive direction of the Z-axis. FIG. 2B shows the arrangement of the component members of fiber coupling device 1001 viewing in the negative direction of the Y-axis.

Laser oscillator 40 includes laser light sources 11 and 12 serving as laser oscillator modules, and laser beam combining module 13 that emits laser beams each emitted from respective one of laser light sources 11 and 12. Laser beam combining module 13 combines laser beams La11 and La12 which are emitted from laser light sources 11 and 12, respectively, and travel in the negative direction of the Z-axis to make laser beam 10 having light intensity distribution having two peaks lined up spatially, and emitted in the positive direction of the X-axis. Combined laser beam 10 is emitted from laser beam outlet 34d.

Laser light sources 11 and 12 are high power lasers emitting laser beams with a near-infrared wavelength. In accordance with the present embodiment, laser light sources 11 and 12 emit a laser beam with a center wavelength of 976 nm and a power of 1 kW.

Laser beam combining module 13 includes synthetic mirrors 31 and 32. Synthetic mirror 31 bends laser beam La11 in the positive direction of the X-axis. Synthetic mirror 32 bends laser beam La12 in the positive direction of the X-axis. Laser beam La11 is emitted from laser light source 11 and has an optical power of 1 kW. Laser beam La12 is emitted from laser light source 12 and has an optical power of 1 kW.

Bend module 39, fiber coupling module 14, and fiber coupling device 1001 are attached to laser beam outlet 34d of laser oscillator 40. Bend module 39 bends combined laser beam 10 and changes a beam path of laser beam 10 to transmit the laser beam. Fiber coupling module 14 guides laser beam 10 to a fiber. Fiber coupling device 1001 includes beam dumper 38 that absorbs laser beam 10. Laser oscillator 40 and fiber coupling device 1001 are connected through laser beam outlet 34d of laser oscillator 40 and laser beam inlet 34f of fiber coupling device 1001.

Bend mirror 16 is disposed in bend module 39. Bend mirror 16 is made of a square parallel-plate quartz with a thickness of 3 mm that has a rectangular shape having sides of 30 mm A high-reflection coating is performed on a surface of mirror 16. Bend mirror 16 is moveable between position P1 located in the positive direction of the Y-axis and position P2 located in the negative direction of the Y-axis from position P1. In order to change the beam path of laser beam 10 from the positive direction of the X-axis to the positive direction of the Y-axis, bend mirror 16 is located at position P1 at an appropriate time. Alternatively, to cause laser beam 10 to run straight in the positive direction of the X-axis, bend mirror 16 is located at position P2 at an appropriate time. In other words, bend mirror 16 optionally switches between beam path Lr1 and beam path Lr2. According to this, plural laser beams La11 and La12, i.e., laser beam 10 is guided to fiber 15, or guided to window 30.

Fiber coupling device 1001 includes housing 91 and window 30 provided in housing 91. Housing 91 faces laser beam outlet 34d and configured to have laser beam 10 to enter Housing 91 of fiber coupling device 1001 includes laser beam inlet 34f connected to laser beam outlet 34d of laser oscillator 40. Laser beam 10 enters housing 91 from laser beam inlet 34f. Window 30 faces laser beam outlet 34d (laser beam inlet 34f). In order to allow laser beam 10 to pass through window 30, a low reflection coating is provided on window 30. The low reflection coating has a low reflectivity for the center wavelength (976 nm) of laser beam 10. Window 30 is made of a quartz having a circular disk shape having a thickness of 2 mm and a diameter of 30 mm. Laser beam 10 can be observed through window 30. Laser beam 10 which has run straight without being reflected by bend mirror 16 passes through window 30.

Fiber coupling device 1001 includes motor 19, shaft 18, and bend mirror holder 17. Motor 19 drives bend mirror 16. Bend mirror 16 is fixed to bend mirror holder 17. Bend mirror holder 17 is connected to motor 19 via shaft 18. Therefore, bend mirror 16 can be moved by motor 19 which rotates in response to an instruction.

If the beam path of laser beam 10 is not bent by bend mirror 16, laser beam 10 runs straight. Beam dumper 38 directly face laser beam 10 that run straight without hitting bend mirror 16. Beam dumper 38 includes a laser absorber having a conical shape inside beam dumper, and absorbs and attenuates the laser beam that has passed through window 30.

Fiber coupling device 1001 further includes fiber coupling module 14 provided outside bend module 39. In bend module 39, laser beam 10 is bent by bend mirror 16 and travels in the positive direction of the Y-axis. Fiber coupling module 14 is provided at a position at which laser beam 10 is emitted. Fiber coupling module 14 has a fiber coupling function to collectively converge laser beam 10 having a light intensity distribution having two peaks lined up spatially and guide the converged laser beam 10 to fiber 15.

Fiber coupling module 14 includes lens module 36 that converges laser beam 10, and receptacle 37 that holds fiber 15 serving as a process fiber.

Lens module 36 movably includes fiber coupling lens 35 that is made of quartz with, for example, a diameter of 30 mm and a focal length of 50 mm, and converges laser beam 10 to a predetermined spot of fiber 15.

Fiber 15 is a quartz based fiber including a core with a diameter of, e.g. 150 micrometers and a clad with a diameter of 400 micrometers. Fiber 15 transmits laser beam 10 having entered the fiber. Fiber 15 is connected to fiber coupling module 14 with receptacle 37.

Laser beam 10 which has entered fiber coupling module 14 travels in fiber 15. Laser beam 10 is used for processing through a working head provided in an output end of fiber 15.

An operation, such as adjustment of an optical axis associated with replacing a laser light source, of fiber coupling device 1001 will be described below. In accordance with the embodiment, replacement of laser light source 11 is assumed, for example.

First, laser light source 11 to be replaced is detached, and then, is replaced by new laser light source 33. Laser light source 33 is configured to emit laser beam La33. After that, bend mirror 16 is raised in the negative direction of the Y-axis with motor 19, so that laser beam 10 runs straight in the positive direction of the X-axis without being bent by bend mirror 16. Beam dumper 38 is detached from bend module 39.

Apparatus 38a is provided at a position to which beam dumper 38 has been attached. Apparatus 38a is configured to observe positions of laser beams 10, La12 and La33, light intensity distributions thereof, and optical power of laser beam 10. Apparatus 38a preferably observes the position of the center of gravity of laser beam 10 as the position of laser beam 10. Apparatus 38a preferably observes a range of 86% of peak light intensity of laser beam 10 as the light intensity distribution of laser beam 10. Thus, synthetic mirror 31 is adjusted such that laser beam La33 emitted from new laser light source 33 illuminates the same place where laser beam La11 emitted from laser light source 11 before the replacement illuminates.

Subsequently, apparatus 38a is removed, and beam dumper 38 is attached to bend module 39 again. Bend mirror 16 is moved in the positive direction of the Y-axis with motor 19. Laser beam La33 emitted from new laser light source 33 is bent by bend mirror 16 and guided to fiber coupling module 14. A power meter provided at an output end of fiber 15 is employed to adjust fiber coupling lens 35.

In accordance with the embodiment, laser beams La11 and La12 are bent perpendicularly by synthetic mirrors 31 and 32, but not intended to limit the angle. Laser beams La11 and La12 may be bent such that laser beam outlet 34d can be observed from window 30. Further, window 30 is not necessarily a parallel plate shape. Window 30 may be a lens having a curved surface with a finite curvature.

Similarly, bend mirror 16 may be a wedge board having a surface with a high-reflection coating provided thereon. Motor 19 is provided inside bend module 39, but not limited to this. Motor 19 may be provided outside bend module 39 so as to drive bend module 39 via shaft 18.

In fiber coupling device 1001 according to Embodiment 1, window 30 is provided in a direction in which laser beam 10 runs straight to face laser beam inlet 34f. However, fiber coupling module 14 may be provided in the direction in which laser beam 10 runs straight to face laser beam inlet 34f. That is, window 30 may be provided in a direction in which laser beam 10 is bent perpendicularly and travels.

For a fiber transmission type of laser beam machine constituted by plural laser light sources, only a specified laser light source among the plural laser light sources is necessary to replace in a production site.

In the conventional fiber coupling device 100 shown in FIG. 4, if an adjustment of an optical axis associated with replacing a laser light source is performed without detaching fiber coupling device 100, a high-power laser beam to be used for processing enters not only a core of process fiber 122, which is used for transmitting a laser beam, but also a clad of process fiber 122. This may cause breakage of process fiber 122.

Therefore, in conventional fiber coupling device 100, the adjustment of an optical axis associated with replacing a laser light source needs detachment of the fiber coupling device. Thus, it is required that an end surface of process fiber 122, a converging lens, a lens module, and a laser oscillator are protected from contamination. In other words, for instance, installation and control of a clean bench for maintaining pure environment, storage of fiber coupling device 100 in a dry state, a clean-air piping system for purging, and a worker's clean environmental correspondence are required.

Inside fiber coupling device 1001 in accordance with Embodiment 1, window 30 faces laser beam inlet 34f. This configuration eliminates necessity for detaching fiber coupling module 14 from bend module 39 when laser light sources 11 and 12 are replaced, so that optical components and a fiber edge can be protected from contamination.

When laser light source 11 and 12 are replaced, fiber coupling module 14 is not detached. This configuration can eliminate a facility for maintaining fiber coupling module 14 in a clean environment, such as a clean bench, and a facility for keeping members in a clean environment during the replacement, such as a dry cabinet.

Further, when laser light sources 11 and 12 are replaced, fiber coupling module 14 is not detached. This also prevents contaminants from invading into laser oscillator 40, thereby eliminating any device or mechanism preventing the invasion of contaminants into laser oscillator 40.

In addition to this, since window 30 faces laser beam inlet 34f, each component located inside bend module 39 is avoided from contamination through window 30. Additionally, a motion of bend mirror 16 can be checked visually through window 30 without exposing the inside of bend module 39, thereby easily detecting abnormalities.

Beam dumper 38 is provided via window 30 which faces laser beam inlet 34f. Thus, even if abnormalities occur in bend mirror 16, laser beam 10 runs straight and is absorbed by beam dumper 38, thereby ensuring safety.

Fiber coupling device 1001 does not necessarily include an exit window. This configuration eliminates a loss caused by insertion of the exit window. Additionally, it is unnecessary to consider a thermal lens effect caused by the exit window.

It is not necessary for fiber coupling module to be detached from bend module 39. This eliminates necessity for extracting fiber 15 from receptacle 37, and protecting an end surface of fiber 15 from contamination.

It is not necessary for fiber coupling module 14 to be detached from bend module 39. This also eliminates necessity for detaching a cooling water hose that cools fiber coupling module 14 and fiber 15. Thus, it is not necessary to stop cooling water that cools fiber coupling module 14 and fiber 15. In other words, it is not necessary to wait for emission of the laser beam until the cooling water which has been stopped once reaches specified temperature. This allows laser light sources 11 and 12 to be replaced efficiently.

If a concave lens is employed as window 30, laser beam 10 entering beam dumper 38 can be diffused. This reduces density of the laser beam received by beam dumper 38, thereby preventing beam dumper 38 from breakage.

Similarly, after beam dumper 38 is detached from bend module 39, apparatus 38a which observes a position, a light intensity distribution, and laser beam power of laser beam 10 or La33 is provided at the position to which beam dumper 38 is attached. A lens is selected according to specifications, such as allowable maximum output, sensitivity, and a size of an effective sensor area, of apparatus 38a. Thus, window 30 can be optimized for apparatus 38a that magnifies and reduces the laser beam to be measured and observes it. This allows the laser beam to be measures efficiently and accurately.

As mentioned above, fiber coupling device 1001 includes housing 91 and window 30 provided in housing 91. Fiber coupling device 1001 is configured to collectively guide plural laser beams La11 and La12 to at least fiber 15. Each of plural laser beams La11 and La12 is emitted from a corresponding one of plural external laser light sources 11 and 12, and enter through laser beam inlet 34f. Housing 91 is configured such that the laser beams La11 and La12 enter housing 91 from laser beam inlet 34f. Window 30 is provided inside housing 91 and faces laser beam inlet 34f.

The laser light sources 11 and 12 cause the laser beams La11 and La12 to enter from laser beam inlet 34f and travel in incident direction DL, respectively. Window 30 may be provided in incidence direction DL from laser beam inlet 34f.

Bend mirror 16 switches between beam path Lr1 in which laser beams La11 and La12 are guided to fiber 15 and beam path Lr2 in which laser beams La11 and La12 are guided to window 30.

Fiber coupling module 14 guides laser beams La11 and La12 to fiber 15.

Beam dumper 38 absorbs laser beam 10 passing through window 30.

Exemplary Embodiment 2

Figure 3A:
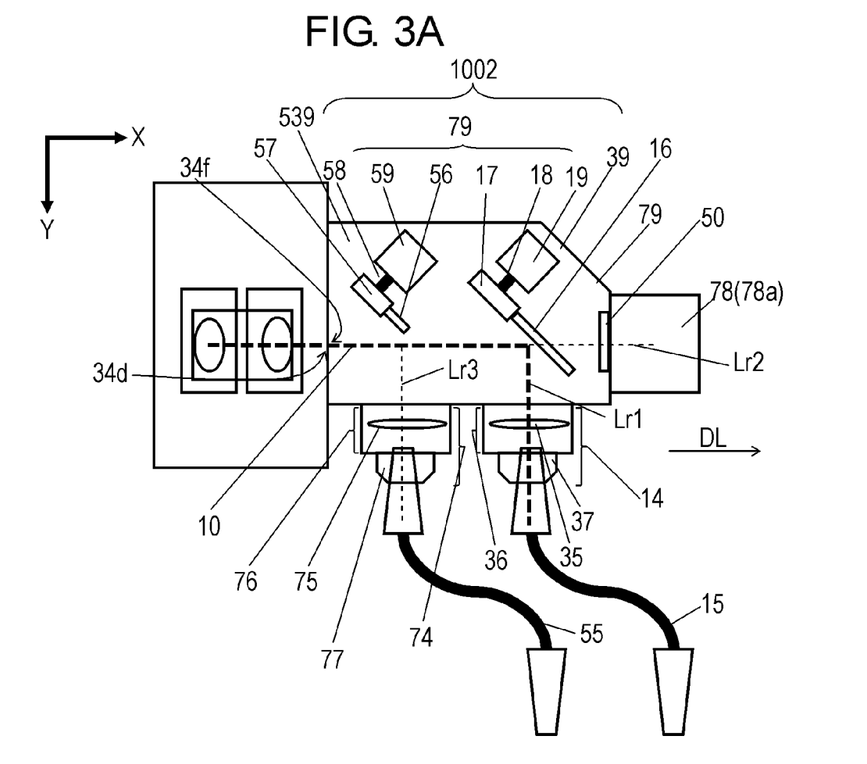
FIG. 3A is a schematic diagram of a fiber coupling device in accordance with Exemplary Embodiment 2.
Figure 3B:
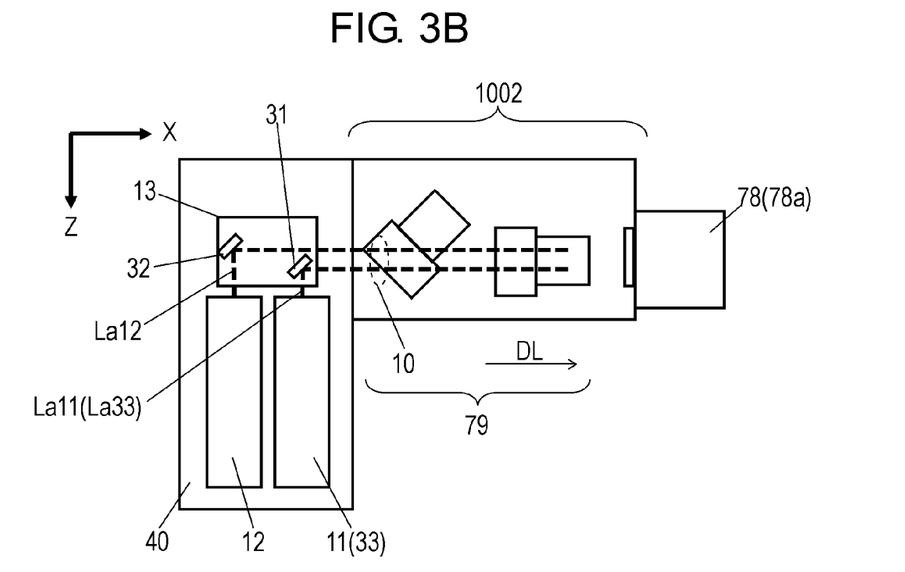
FIG. 3B is a schematic diagram of the fiber coupling device in accordance with Embodiment 2.

FIGS. 3A and 3B are schematic diagrams of fiber coupling device 1002 in accordance with Exemplary Embodiment 2. FIG. 3A shows an arrangement of components of fiber coupling device 1002 viewing in the positive direction of the Z-axis. FIG. 3B shows an arrangement of components of fiber coupling device 1002 viewing in the negative direction of the Y-axis. In FIGS. 3A and 3B, components identical to those of fiber coupling device 1001 in accordance with Embodiment shown in FIGS. 1 to 2B are denoted by the same reference numerals. Fiber coupling device 1002 includes bend connection module 79 instead of bend module 39 of fiber coupling device 1001 in accordance with Embodiment 1. Fiber coupling device 1002 includes window 50 instead of window 30. Fiber coupling device 1002 includes beam dumper 78 instead of beam dumper 38. Window 50 is made of non-coat quartz. Beam dumper 78 is configured to temporarily store cooling water that circulates through the inside of beam dumper 78.

Bend connection module 79 is attached to laser beam outlet 34d of laser oscillator 40. Bend connection module 79 includes two bend modules 39 and 539 arranged in series. Bend modules 39 and 539 bend and transmit laser beam 10 to change a beam path laser beam 10.

Plural bend mirrors 16 and 56 are disposed inside bend connection module 79. Bend mirrors 16 and 56 are parallel plate mirrors having surfaces having high reflection coating are provided thereon. Both bend mirrors 16 and 56 are controllably moved in the positive direction of the Y-axis as necessary to change the beam path of laser beam 10 to the positive direction of the Y-axis, or moved in the negative direction of the Y-axis as necessary to cause laser beam 10 to run straight. Specifically, bend mirror 16 switches between beam path Lr1 and beam path Lr2. Thus, plural laser beam La11 and La12, i.e., laser beam 10 is guided selectively to fiber 15 and window 30. Bend mirror 56 switches between beam path Lr3 and beam path Lr2. Thus, plural laser beam La11 and La12, i.e., laser beam 10 is guided selectively fiber 55 and window 30.

Window 50 faces laser beam inlet 34f. Window 50 is made of a parallel flat plate made of quartz having a surface having low reflection coating provide thereon so as to have low reflectance for the center wavelength (976 nm) of laser beam 10. The parallel flat plate has a circular disk shape with a diameter of 30 mm and a thickness of 2 mm. After running straight without being reflected by bend mirrors 16 and 56, laser beam 10 passes through window 50, and therefore, can be observed through window 50.

Motor 19, shaft 18, and bend mirror holder 17 drive bend mirror 16. Bend mirror 16 is fixed to bend mirror holder 17. Bend mirror holder 17 is connected to motor 19 via shaft 18. Motor 19 rotates in response to an instruction so as to move bend mirror 16.

Similarly, motor 59, shaft 58, and bend mirror holder 57 drive bend mirror 56. Bend mirror 56 is fixed to bend mirror holder 57. Bend mirror holder 57 is connected to motor 59 via shaft 58. Motor 59 rotates in response to an instruction so as to move bend mirror 56.

Beam dumper 78 is provided outside bend connection module 79. Beam dumper 78 faces laser beam 10 directly because laser beam 10 runs straight without being bent by bend mirrors 16 and 56 when the beam path of laser beam 10 is not bent by bend mirror 16 or 56. A laser absorber is provided inside beam dumper 78. The laser absorber is configured to temporarily store circulating cooling water so as to absorb laser beam 10 that has passed through window 50.

Fiber coupling module 14 is provided outside bend connection module 79, i.e., at a position where laser beam 10 illuminates when the beam path of laser beam 10 is bent by mirror 16. Fiber coupling module 14 has a fiber coupling function to converge and guide laser beam 10 to fiber 15. Fiber coupling module 74 is provided outside bend connection module 79, i.e., at a position where laser beam 10 illuminates when the beam path of laser beam 10 is bent by mirror 56. Fiber coupling module 74 has a fiber coupling function to converge and guide laser beam 10 to fiber 55.

Upon being controlled in response to an instruction, motors 19 and 59 cause laser beam 10 to be guided selectively to fiber coupling module 14, fiber coupling module 74, and the beam dumper 78.

Fiber coupling module 14 includes lens module 36 that converges laser beam 10, and receptacle 37 that holds fiber 15.

Lens module 36 movably includes fiber coupling lens 35 made of a quartz with, for example, a diameter of 30 mm and a focal length of 50 mm, and converges laser beam 10 to a predetermined spot of fiber 15.

Fiber 15 is made of a quartz based fiber with a core diameter of, e.g. 150 micrometers and a clad diameter of 400 micrometers, and transmits laser beam 10 entering the fiber. Fiber 15 is connected to fiber coupling module 14 with receptacle 37.

Laser beam 10 which has entered fiber coupling module 14 is transmitted in fiber 15, and used for processing through a working head provided in an output end of fiber 15.

Similarly, fiber coupling module 74 includes lens module 76 that movably includes fiber coupling lens 75 that converges laser beam 10, and receptacle 77 that holds fiber 55 serving as a process fiber that transmits laser beam 10. Fiber 55 is connected to fiber coupling module 74 with receptacle 77. Laser beam 10 which has entered fiber coupling module 74 is transmitted in fiber 55, and used for processing through a working head provided in an output end of fiber 55.

An operation, such as an adjustment of an optic axis associated with replacing laser light sources 11 and 12, of fiber coupling device 1002 will be described below. An operation of replacing laser light source 11 in accordance with Embodiment 2 will be described.

First, laser light source 11 to be replaced is detached and replaced by new laser light source 33. After that, in order to cause laser beam 10 to run straight without being bent by bend mirrors 16 and 56, bend mirror 16 is raised in the negative direction of the Y-axis with motor 19, and bend mirror 56 is raised in the negative direction of the Y-axis with motor 59. Beam dumper 78 is detached from bend connection module 79.

Apparatus 78a is disposed at a position to which beam dumper 78 is attached, Apparatus 78a is configured to observe and measure positions, light intensity distributions, and laser beam power of laser beam 10 or laser beams La12 and La33. Thus, synthetic mirror 31 is adjusted such that laser beam La33 which is emitted from new laser light source 33 illuminates the same place where laser beam La11 which is emitted from laser light source 11 before the replacement illuminates. Subsequently, beam dumper 78 is attached to bend connection module 79 again.

Bend mirror 16 is lowered in the positive direction of the Y-axis with motor 19, and laser beam 10 is bent by bend mirror 16 and guided to fiber coupling module 14. A power meter provided at an output end of fiber 15 is employed to adjust fiber coupling lens 35.

After that, bend mirror 16 is raised in the negative direction of the Y-axis with motor 19, and then, bend mirror 56 is lowered in the positive direction of the Y-axis with motor 59. Thus, laser beam 10 is bent by bend mirror 56 and guided to fiber coupling module 74. A power meter provided at an output end of fiber 55 is employed to adjust fiber coupling lens 75.

In fiber coupling device 1002 according to Embodiment 2, two bend modules 39 and 59 are connected in series, but not limited to this. Three or more bend modules may be connected in series. Instead of beam dumper 78, fiber coupling device 1002 may include another fiber coupling module.

Bend mirrors 16 and 56 both are mirrors constituted by a parallel flat plate having surfaces having high reflection coating provided thereon. However, bend mirror 16 may be a mirror constituted by a parallel flat plate having surfaces having high reflection coating provided thereon, and bend mirror 56 may be a mirror constituted by a parallel flat plate having surfaces having partial reflection coating provided thereon, i.e., reflection coating of which reflectance is, e.g. 50%. Laser beam 10 emitted from laser beam outlet 34d hits on bend mirror 56, and then, hits on bend mirror 16. In the entire amount of laser beam 10 that hits on bend mirror 56, a certain amount (50% in accordance with Embodiment 2) is reflected by bend mirror 56, and the remaining amount (50% in accordance with Embodiment 2) passes through bend mirror 56. Laser beam 10 that has passed through bend mirror 56 hits on bend mirror 16 having total reflection coating provided thereon, and the entire amount of laser beam 10 is reflected and guided to fiber 15 through fiber coupling module 14. The amount of laser beam 10 reflected on bend mirror 56 is guided to fiber 55 through fiber coupling module 74. Only bend mirror 56 among bend mirrors 16 and 56 is thus constituted by a parallel plate mirror having partial reflection coating provided thereon, thereby guiding laser beam 10 to two fibers 15 and 55 simultaneously.

As mentioned above, window 50 facing laser beam inlet 34f is provided inside fiber coupling device 1002 that guides laser beam 10 to plural fibers 15 and 55. This configuration eliminates necessity for exposing the inside of bend connection module 79 when laser light source 11 is replaced, thereby protecting components inside bend connection module 79, especially bend mirrors 16 and 56, from contamination. This configuration eliminates a device and mechanism that purges air with pressurized clean air to prevent contaminants from invading into bend connection module 79.

Motors 19 and 59 are provided inside bend connection module 79. Thus, only an electric signal wire which conveys instructions passes through from the inside to the outside of bend connection module 79, thereby easily providing a dustproof structure.

Non-coat quartz having no coating provided thereon is used as window 50, thereby reducing the cost. In addition to this, window 50 for sealing bend connection module 79 is shared as a lid for sealing circulating cooling water temporarily stored in beam dumper 78.

Only bend mirror 56 among bend mirrors 16 and 56 is constituted by a parallel plate mirror having partial reflection coating provided thereon, thereby guiding laser beam 10 to two fibers 15 and 55 simultaneously.

Fiber coupling device 1002 is configured to collectively guide plural laser beam La11 and La12 to fibers 15 and 55. Bend mirror 56 switches between beam path Lr2 and beam path Lr3 in which laser beam La11 and La12 are guided to fiber 55. Fiber coupling module 14 guides laser beams La11 and La12 to fiber 15. Fiber coupling module 74 guides laser beams La11 and La12 to fiber 55.

INDUSTRIAL APPLICABILITY

A fiber coupling device in accordance with the present invention allows a laser light source to be replaced easily, and is useful for a laser beam machine of a fiber transmission type, or the like.

REFERENCE MARKS IN THE DRAWINGS 10 laser beam
11 laser light source (first laser light source)
12 laser light source (second laser light source)
13 laser beam combining module
14 fiber coupling module
15 fiber
16 bend mirror
17 bend mirror holder
18 shaft
19 motor
30 window
31 synthetic mirror
32 synthetic mirror
33 laser light source
34d laser beam outlet
34f laser beam inlet
35 fiber coupling lens
36 lens module
37 receptacle
38 beam dumper
39 bend module
40 laser oscillator
50 window
55 fiber
56 bend mirror
57 bend mirror holder
58 shaft
59 motor
74 fiber coupling module
75 fiber coupling lens
76 lens module
77 receptacle
78 beam dumper
79 bend connection module
91 housing
Lr1 beam path (first beam path)
Lr2 beam path (second beam path)
Lr3 beam path (third beam path)

The invention claimed is:
1. A fiber coupling device comprising:
a housing;
a window provided in the housing,
wherein the fiber coupling device is configured to collectively guide a plurality of laser beams to at least a first fiber, each of the plurality of laser beams being emitted from a corresponding one of a plurality of external laser light sources and entering through a laser beam inlet,
wherein the housing is configured such that the plurality of laser beams enter the housing from the laser beam inlet, and
wherein the window is provided inside the housing and faces the laser beam inlet; and
a first mirror that switches selectively between a first beam path through which the plurality of laser beams are guided to the first fiber and a second beam path through which the plurality of laser beams are guided to the window.
2. The fiber coupling device according to claim 1,
wherein each of the plurality of external laser light sources cause a corresponding one of the plurality of laser beams to enter from the laser beam inlet and travel in an incident direction, and
wherein the window is located in the incident direction from the laser beam inlet.

3. The fiber coupling device according to claim 1, further comprising a fiber coupling module that guides the plurality of laser beams to the first fiber.

4. The fiber coupling device according to claim 1, wherein the fiber coupling device is configured to collectively guide the plurality of laser beams to the first fiber and a second fiber, the fiber coupling device further comprising:
- a second mirror that switches electively between the second beam path and a third beam path through which the plurality of laser beams are guided to the second fiber;
- a first fiber coupling module that guides the plurality of laser beams to the first fiber; and
- a second fiber coupling module that guides the plurality of laser beams to the second fiber.

5. The fiber coupling device according to claim 1, further comprising a beam dumper that absorbs the plurality of laser beams passing through the window.

* * * * *